United States Patent [19]

Keim et al.

[11] 4,404,486
[45] Sep. 13, 1983

[54] STAR CONNECTED AIR GAP POLYPHASE ARMATURE HAVING LIMITED VOLTAGE GRADIENTS AT PHASE BOUNDARIES

[75] Inventors: Thomas A. Keim, Clifton Park; Stephen H. Minnich, Schenectady, both of N.Y.

[73] Assignee: General Electric Company, Schenectady, N.Y.

[21] Appl. No.: 220,203

[22] Filed: Dec. 24, 1980

[51] Int. Cl.³ .......................................... H02K 19/00
[52] U.S. Cl. .................................. 310/198; 310/201; 310/52
[58] Field of Search ............... 310/190, 201, 205, 206, 310/207, 208, 202, 203

[56] References Cited
U.S. PATENT DOCUMENTS
3,743,875 7/1973 Smith, Jr. et al. .................. 310/198

4,200,817 4/1980 Bratoljic .............................. 310/198

Primary Examiner—Donovan F. Duggan
Attorney, Agent, or Firm—Charles E. Bruzga; James C. Davis, Jr.; Marvin Snyder

[57] ABSTRACT

A star (wye) connected air gap polyphase armature having limited voltage differences between physically adjacent coil windings at the phase boundary for the different phase circuits. The unconnected lead of the coil or coils at the first edge of the phase belt region forms the neutral terminal for connection of the phase winding in a star or wye circuit comprised of other similarly formed phase windings, and the unconnected lead of the last coil or coils remaining at the middle of the phase belt region forms the line terminal for the multiple coil phase winding to thereby minimize voltage differences between turns of physically-adjacent phase windings at the phase boundaries.

20 Claims, 12 Drawing Figures

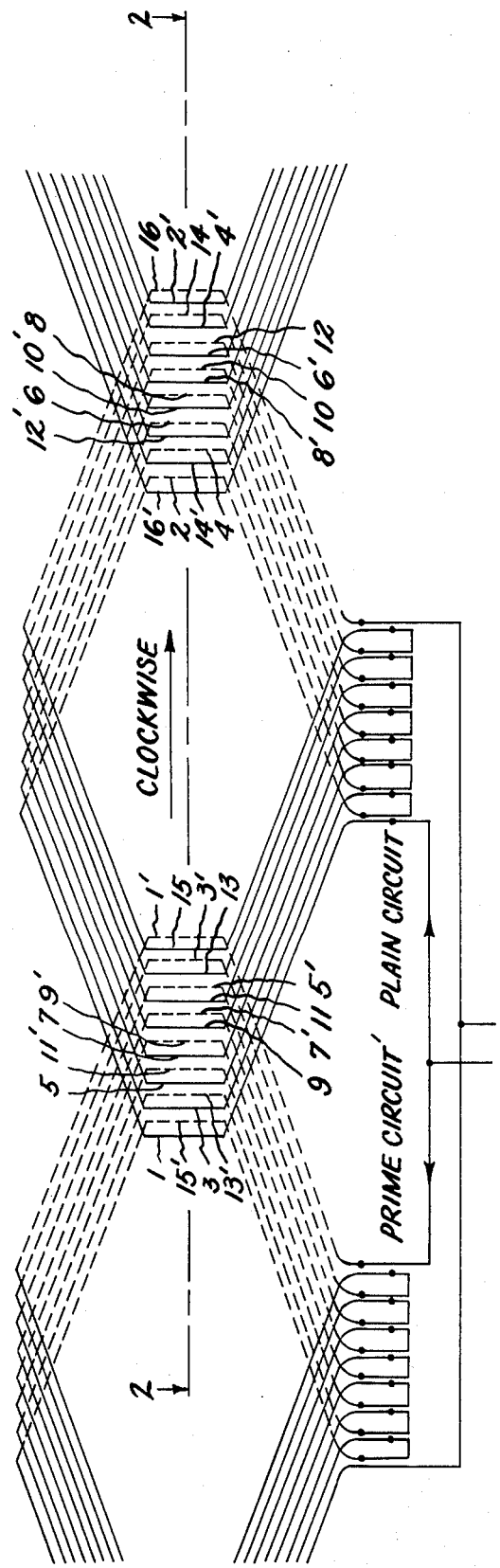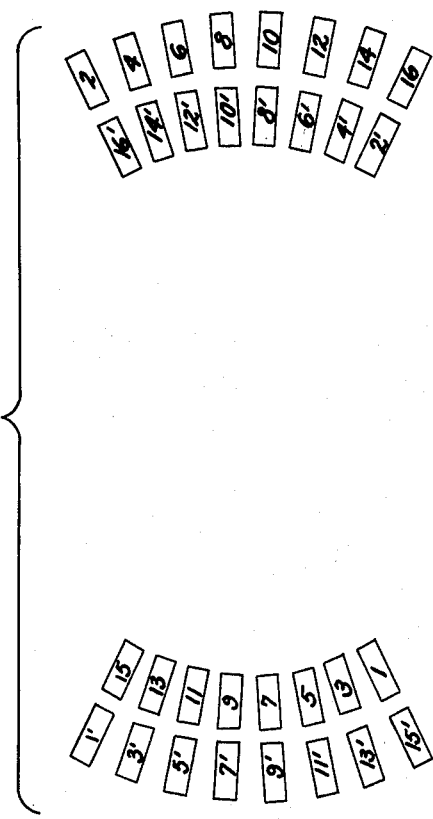

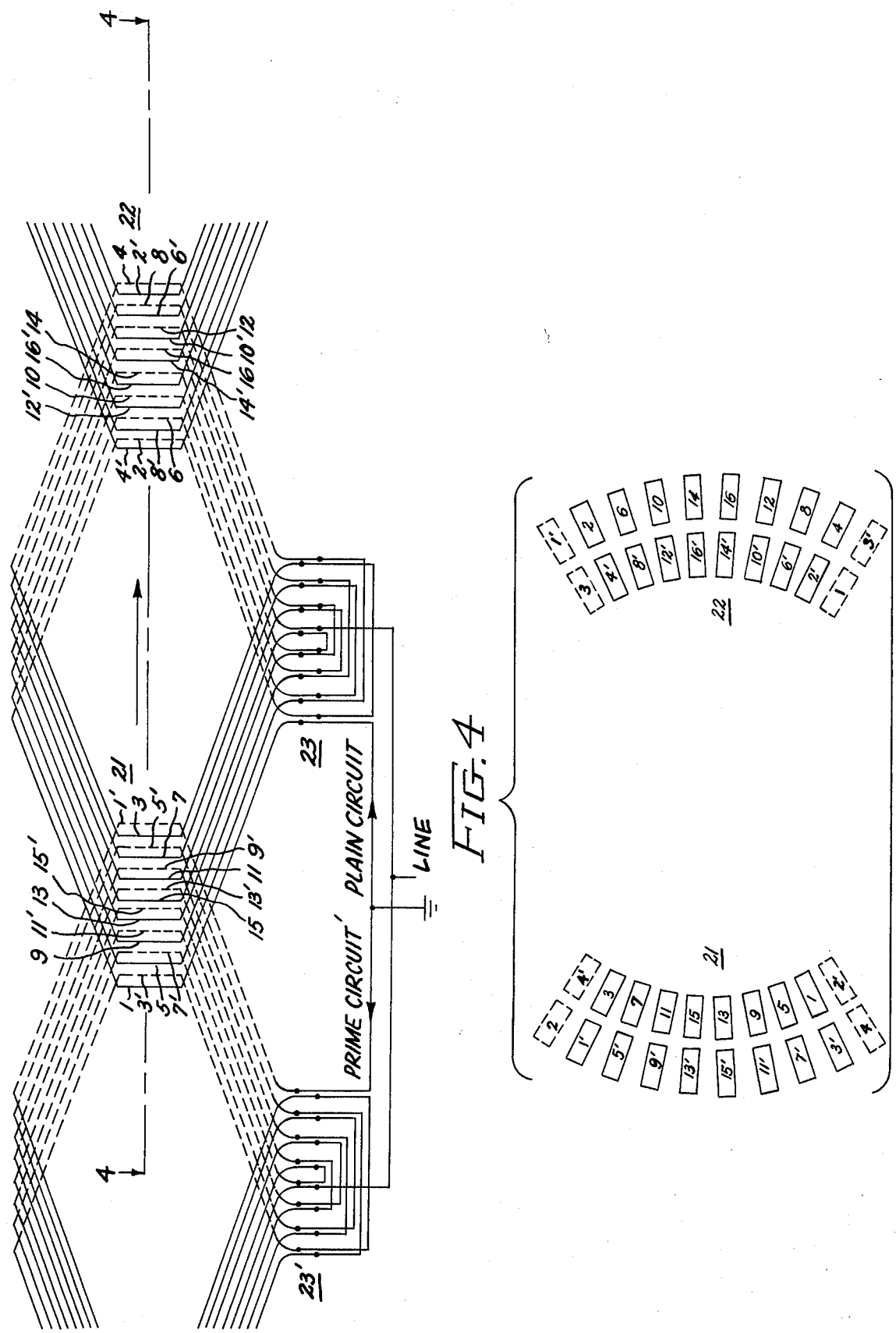

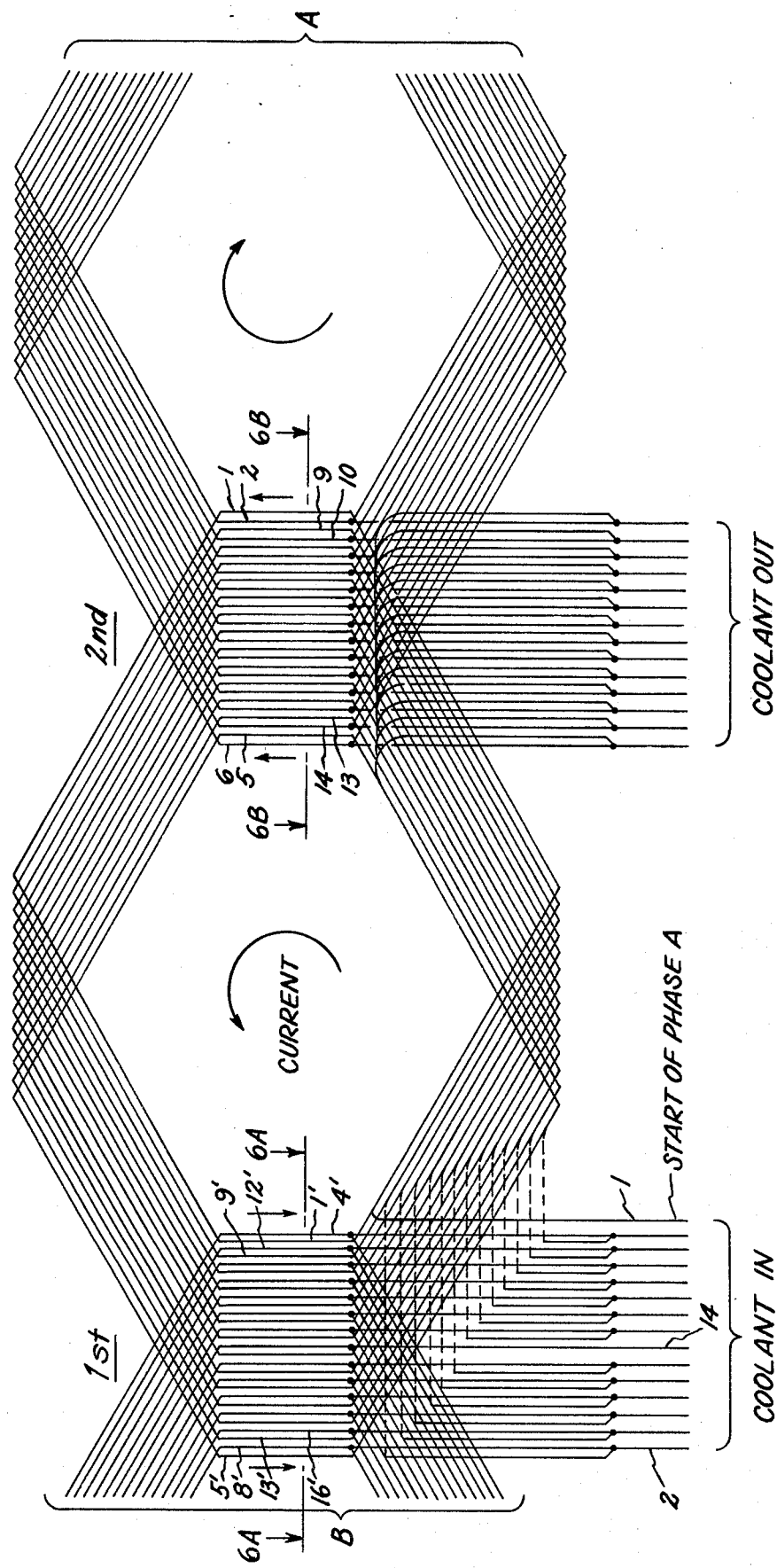

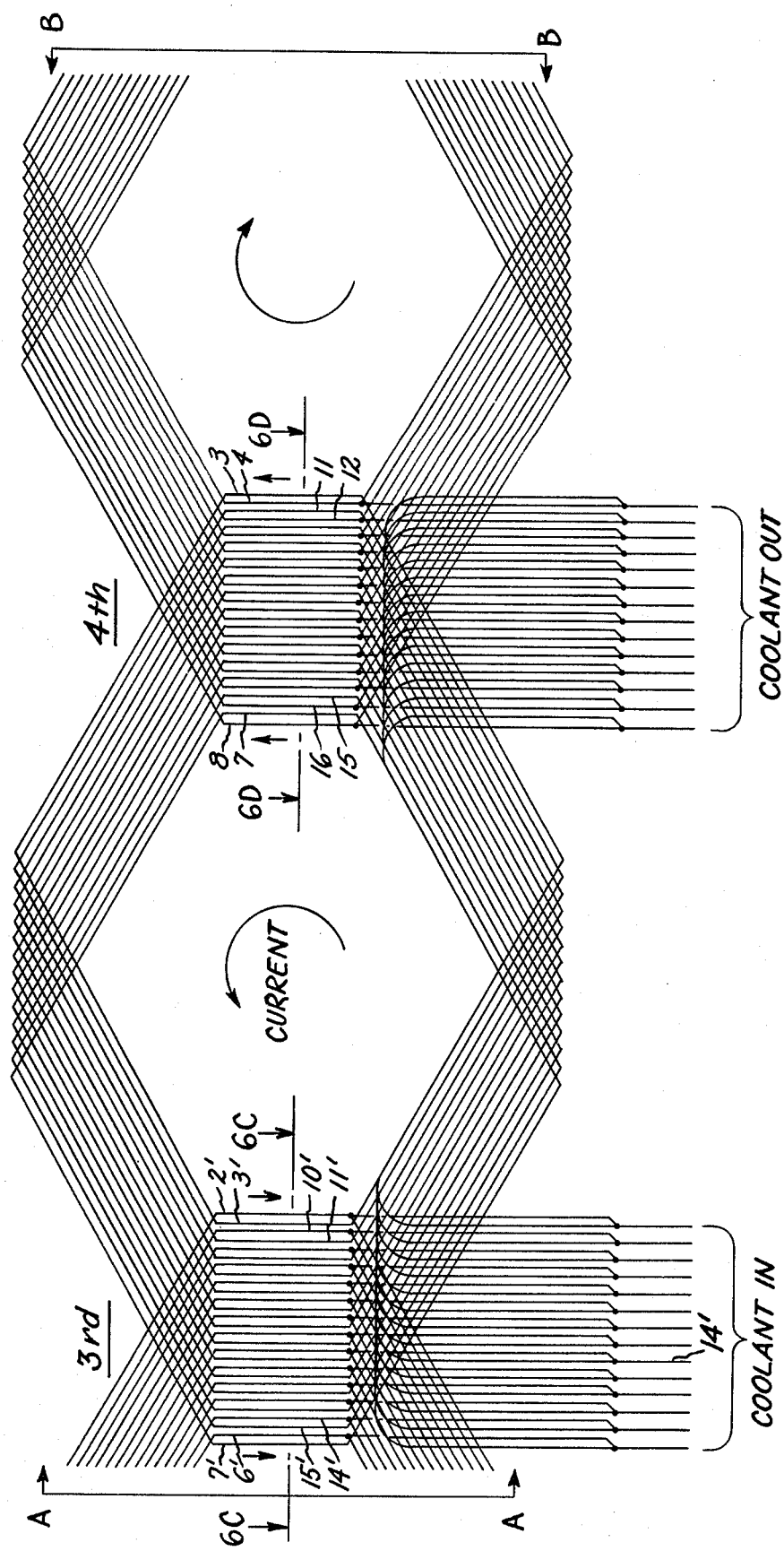

COOLANT IN   COOLANT OUT

COOLANT OUT   COOLANT IN

STAR CONNECTED AIR GAP POLYPHASE ARMATURE HAVING LIMITED VOLTAGE GRADIENTS AT PHASE BOUNDARIES

BACKGROUND OF THE INVENTION

This invention relates to new and improved star (wye) connected, air gap, polyphase armatures for polyphase alternating current electric generators and motors and to the method of making the same.

More particularly, the invention relates to polyphase air gap type armatures as opposed to slot embedded armatures of the type having electrically grounded iron teeth between the coil conductors of the armature. In air gap type armatures, a graded-voltage armature can be formed by connecting adjacent winding turns of each phase in series electrical relationship in a manner such that potential increases nearly uniformly from coil to coil along the periphery of the active phase belt regions of each phase of the polyphase armature and no large voltage differences exist between physically adjacent coils within the phase belt. The invention makes it possible to build such polyphase air gap armatures wherein additionally no large voltage differences are produced between physically adjacent coil windings of the different phases at the phase boundaries, and is particularly useful in the construction and operation of cryogenic superconducting generator and motor armatures designed for transmission level voltages.

Many of the interconnection patterns known and commonly employed in fabricating conventional polyphase generator armatures produce a voltage pattern nearly suitable for a graded-voltage armature. However, in these known techniques and constructions, grounded iron teeth are interposed between the coil winding conductors to form what are called slot embedded armatures, and the presence of the grounded iron teeth requires each conductor to be insulated for bar-to-ground voltage. In contrast, in certain types of generator constructions, such as in a superconducting generator, it is possible to use only insulating materials between the adjacent coil conductors comprising the armature windings and a well-graded pattern of voltage differences can be established within each phase belt of the armature active annulus region.

If a graded-voltage armature is formed by connecting the adjacent winding turns of each phase group in series in a conventional lap or wave winding, the potential increases nearly uniformly from coil to coil along the periphery of each phase belt from one end of the phase belt to the other. If the armature is star (wye) connected, the regular progression of potential is interrupted at the boundaries between phase belts, at which point nearly full line-to-neutral voltage appears between the physically adjacent coil windings of the different phase belts. The space available for insulating against this voltage is so severely limited that this problem nearly rules out the use of conventional star (wye) connections for coil windings formed in this manner. The phase boundary voltage problem in graded-voltage wound armatures can be eliminated by delta connections, but this practice has other undesirable features as will be discussed hereinafter.

As a simple illustration of the above-discussed factors, reference is made to FIG. 1 of the drawings in conjunction with FIG. 2. FIG. 1 illustrates one phase group of a forty-eight coil, three-phase, double circuit, two pole, full pitch, two layer air gap armature wherein the winding pattern is a simple lap winding, conventionally connected in wye. FIG. 2 represents a cross-sectional view in the radial plane of the partial armature shown in FIG. 1. Each rectangle in FIG. 2 represents a coil side which can be considered to be the active region of the coil with the plurality of coil sides immediately adjacent each other forming the phase belt for the respective phase winding shown. The numbers identified with each coil side indicate the order of interconnection of the respective coil sides in series circuit relationship with the numbers having a superscript representing the prime circuit and the plain numbers the plain circuit. In considering the drawings, it should be kept in mind that a complete coil will be comprised of two coil sides, one on the radially-inner layer (solid line) and the other on the radially-outer layer (dotted line). From a consideration of FIGS. 1 and 2 it will be seen that the voltage between any two adjacent coil sides is nearly proportional to the difference between their numbers, taken without regard for the presence or absence of a superscript, and that the voltage difference between circumferentially adjacent coil in the same phase windings is seen to be 2/16th of the phase voltage.

The winding method and construction illustrated in FIGS. 1 and 2 possess a number of advantages. For example, all the coils are geometrically identical and have nearly identical electrical duties, so that all the coils may be made by essentially the same method. The pitch factor and the breadth factor are both satisfactorily high, and the factors limiting packing density of the insulated coils are no more restrictive than in a low voltage air gap armature.

The main shortcoming of the winding construction and method shown in FIGS. 1 and 2 stems from the fact that the coils at the circumferential extremities of each phase belt differ in potential by essentially the full phase voltage. Thus, if one terminal of the winding is made the neutral of a star connection (wye for three phase), the other circumferential edge of the winding is at line voltage. In polyphase armatures composed of a number of identical phase windings, the high voltage winding edge is of necessity physically adjacent the neutral winding edge of the next phase. The provision of adequate insulation at such phase boundaries is one of the most difficult problems in design of a graded-voltage armature.

In order to overcome the problems described in the preceding paragraph, polygon (delta in the three phase case) connected armatures have been proposed. However, polygon-connected armatures have other disadvantages compared to star (wye) connections, and as a result the vast majority of polyphase AC machines are star-connected. Some of the disadvantages of the polygon-connected armatures place constraints on the machine design. For example, third harmonic in the field winding flux will induce circulating currents in a delta-connected armature whereas in a star-connected armature no such comparable circulating currents can be induced. Other inherent disadvantages arise because of the restrictions placed on the design of the polyphase system to which such a machine is connected. These disadvantages then must be compared to the problem of insulating a star-connected generator to overcome the above-discussed high voltage differences across the phase boundaries.

SUMMARY OF THE INVENTION

The present invention makes available to the industry a method of construction for graded-voltage armature windings which is particularly useful in fabricating armatures, which method and construction all employ in some manner, the simple principle that conductors which are physically close together should be interconnected in series circuit relationship so as to have a small difference in electrical potential between them. Conductor insulation requirements in this type of armature winding are determined by the relatively modest local conductor-to-conductor voltages, rather than by conductor-to-ground voltage. Thus, the method and construction of the invention makes it possible to construct armatures for higher terminal voltages and/or higher overall current density than would otherwise be possible with conventional methods of construction.

In accordance with the above briefly-stated principle, the invention provides a method and construction of star-connected air gap armatures wherein both circumferential edges of each phase belt in the armature are maintained nearly at neutral voltage, and high voltage differences between adjacent turns in the same phase belt or between the outermost turns in adjacent different phase belts are eliminated both internal to a phase belt and at the phase boundaries. This is achieved with a construction wherein the individual coils from which the armature is constructed are very nearly identical in fabrication to those that would be employed in a conventional lap or wave winding. This improvement in the electrical arrangement of the armature makes it possible to construct wye connected armatures for higher terminal voltage and/or higher overall current density ratings than otherwise would be possible in a given size apparatus.

It is therefore a primary object of the present invention to provide new and improved star-connected, air gap, polyphase armatures for polyphase alternating current electrical machines and the method of making the same.

A more specific object of the invention is to provide such star-connected, air gap, polyphase armatures wherein a graded voltage is formed by connecting adjacent winding turns of each phase in series circuit relationship in a manner such that potential increases nearly uniformly from coil to coil along the periphery of the active phase belt regions of each phase and between phase boundaries so that no abrupt large voltage differences are produced between physically adjacent coil windings of the respective phase belts or at the phase boundaries between the phase belts.

A further object of the invention is to provide an improved star-connected armature construction and method of winding whereby increased conductor packing factor and decreasing insulation packing factor is obtained in the active annulus region of the armature.

The instant invention provides an armature comprising a plurality of wound coils which are electrically interconnected into a plurality of different phase groups to form the polyphase windings of the armature. Each coil in each phase group has a plurality of active regions (coil sides) in which an electromotive force is induced with the active regions being brought together by the coil winding connections into respective phase belt regions. The number of phase belt regions for each phase group is equal to the number of poles of the machine for which the armature is designed. The contiguous phase belt regions of all of the phase groups form the active annulus region of the armature with the spaces between the respective phase belt regions comprising the phase boundaries. The invention consists of a method for and pattern of interconnecting the winding turns of the coils in each phase group in a manner such that an outermost set comprising a coil or coils of a phase belt is serially connected by jumper leads in series electrical circuit relationship with the remaining opposite outermost sets of coils of the same phase belt, which are physically displaced from the first-mentioned outermost set at a corresponding location on the opposite outermost edge of the same phase belt.

The next outermost alternate set of coils of the same phase belt physically displaced inwardly from the first outermost sets of coils are serially interconnected with each other and with the first-mentioned sets of serially-connected outermost coils. In the same alternate manner, sets of coils near one edge of a phase belt are connected in series electrical circuit relationship with sets of coils at or near the corresponding position at the opposite edge of the same phase belt, progressing to the innermost sets of coils of each phase belt. The unconnected lead of the sets of coils at the first edge of the phase belt forms the neutral terminal for connection of the phase winding in a star circuit, and the unconnected lead of the last sets of coils remaining in the middle of the phase belt forms the line terminal for the multiple coil phase winding. Thereby the voltage difference between physically adjacent coils of the different phase windings at the respective phase boundaries is reduced to a value of the same order as the internal coil-to-coil voltage difference.

BRIEF DESCRIPTION OF THE DRAWINGS

The above and other objects, features and many of the attendant advantages of this invention will be better understood upon a reading of the following detailed description considered in connection with the accompanying drawings wherein like parts in each of the several figures are identified by the same reference numeral, and wherein:

FIG. 1 is a wiring diagram illustrating one phase of a forty-eight coil, three phase, double circuit, two layer, air gap armature employing a simple lap winding pattern conventionally connected;

FIG. 2 is a cross-sectional view in the radial plane of the armature phase winding shown in FIG. 1;

FIG. 3 is a wiring diagram illustrating one phase of a forty-eight coil, three phase, double circuit, two layer armature whose coils are interconnected in a pattern in accordance with the invention;

FIG. 4 is a cross-sectional view in the radial plane of the armature phase winding shown in FIG. 3;

DESCRIPTION OF THE PREFERRED EMBODIMENTS

Figure 5C:
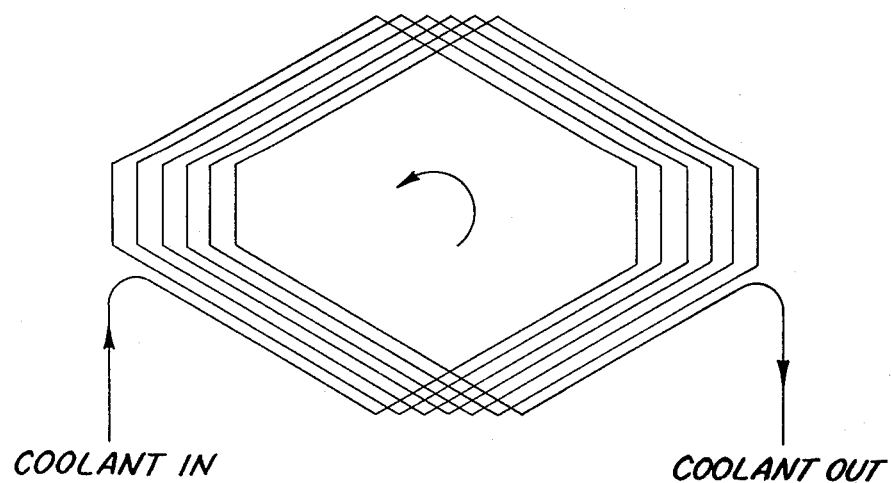
FIGS. 5A and 5B together comprise a wiring diagram representing one phase of a single layer, four pole, single circuit armature winding according to the invention and wherein each hexagonal loop in the main phase winding diagram illustrated in FIGS. 5A and 5B represents a multi-turn coil having either the form shown in FIG. 5C or alternately the form shown in FIG. 5D, which are alternated around the periphery of the armature comprised in part by the phase windings shown in FIGS. 5A and 5B combined.

FIG. 3 illustrates one phase of a forty-eight coil, three phase, double circuit, two layer air gap armature constructed according to the invention. FIG. 4 represents a cross-sectional view in the radial plane of the partial armature shown in FIG. 3. In FIG. 4, each rectangle represents a coil side of each coil comprising the phase winding shown in FIG. 3. It should be noted that in a completed three phase armature, there will be an additional two phases added to the phase winding shown in FIGS. 3 and 4 so that in FIG. 4 the rectangular shape coil sides would in effect form a complete annulus. Several of the coil sides from such other phases are shown as dotted outline boxes in FIG. 4. The spaces occupied by phase windings not illustrated in full in FIG. 4 are indicated by brackets. The phase boundaries between each of the phase windings (also referred to as phase breaks) therefore will occur between the solid line coil sides 1' and 3 and the dotted line coil sides 2 and 4'; the solid line coil sides 3' and 1 and the dotted line coil sides 4 and 2' on the left-hand side of FIG. 4 as viewed by the reader, and also will occur between the dotted line coil sides 1 and 3' and the solid line coil sides 2' and 4 and solid line coil sides 4' and 2 and dotted line coil sides 3 and 1' as shown on the right-hand side of FIG. 4. Additional phase boundaries (phase breaks) also will occur between the two phase windings not illustrated in full in FIGS. 3 and 4 but depicted by the brackets. As thus visualized it will be appreciated that FIG. 4 depicts a cross-sectional view taken through the active annulus region of the armature.

Multi-turn or single-turn coils, or groups thereof, are formed by electrical connection of corresponding coils or coil sides from each pole of a multi-pole winding into a plurality of different phase groups, one of which is shown in FIGS. 3 and 4, to thereby form the polyphase windings of the armature. Each coil in each phase group has a plurality of active regions (coil sides) in which an electromotive force is induced, with the active regions (coil sides) being brought together by the coil winding configurations into respective phase belts shown at 21 and 22, respectively, in both FIGS. 3 and 4. Since the phase winding shown in FIGS. 3 and 4 is for use in a two-pole machine, two phase belts are provided for each phase winding. It will be further appreciated that the contiguous phase belt regions of all of the phase windings (phase groups) form the active annulus region of the polyphase armature with the spaces between the respective phase belt regions comprising the phase boundaries (phase breaks).

Beginning at the neutral end of a phase belt 21 with coil sides at or near one circumferential edge of phase belt 21, the coil sides within the phase winding (phase group) are interconnected by connecting a coil side 1 from one edge of a first phase belt 21 to a coil side 2 at the edge of second phase belt 22, one pole pitch removed from the first phase belt. The coil side 2 of the second phase belt 22 is then connected to a coil side 3 of the first phase belt 21 at or near the circumferential edge opposite coil side 1 of the first phase belt. Coil side 3 is connected to coil side 4 at the circumferential edge opposite coil side 2 of the second phase belt 22. Coil side 4 is connected to coil side 5 near the edge of the first phase belt 21 adjacent coil side 1. The remaining inner coil sides are interconnected in the same manner by continuing the connection pattern through alternate ones of the remaining unconnected inner coil sides and serially connecting these inner coil sides in the same alternate manner, and finishing with the coil sides at the center of the phase belt.

The foregoing paragraph describes, in summary form, the totality of interconnections among the coil sides according to the purpose of the invention. As further elucidation, the interconnections of the parts of the winding into the entities conceptually referred to as coils is described in the present paragraph. The connection between each odd-numbered coil side in FIG. 3 and the next higher even-numbered coil side is made by the end turn structure schematically indicated by solid lines sloping upward to the right and dashed lines sloping downward to the right. Each such pair of coil sides is identical to every other, except for its physical and electrical relationship with the others. Such pairs of coil sides may be called coils. Coils may be formed by joining physically distinct coil sides, or they may be fabricated as entities. The path of current in a coil in FIG. 3 may progress from the terminal at which current enters, indicated by a dot, from the upper row of dots in one of the connection regions 23 or 23', through the odd-numbered coil side, through the end turn structure connecting coil sides, through the even-numbered coil side to the terminal from which current leaves the coil, indicated by a dot from the lower row of dots, in which case the coil is termed a single turn coil. Alternatively, the coil may be constructed so that the current path passes several times alternately through the odd and even numbered coil sides, in which case the coil is termed a multi-turn coil. Similarly, several coils may be connected in series electrical relationship to form a structure functionally equivalent to a multi-turn coil. The illustrative coils in FIG. 3 may be taken with equal validity to represent single turn or multi-turn coils or series connected groups of groups.

Once the desired configuration of single or multi-turn coils has been formed as described in the preceding paragraph, the interconnections to form the winding connections according to the present invention are made in the form of conductors disposed at the end of the generator, known in the trade as "jumpers". These connections can be recognized as the horizontal lines (24) in FIG. 3, connecting the terminals of different coils in serial relationship.

A set of coils, which may comprise a single coil or a plurality of coils, having coil sides at or near one circumferential edge of the phase belt pair, is connected in series electrical circuit relationship with a set of coils having coil sides at or near the opposite circumferential edge of the same phase belt pair. The next outermost alternate sets of coils of the same phase belt pair physically displaced inwardly from the first set of coils are serially interconnected with the first-mentioned set of outermost coils in the same alternate manner. The remaining coils are interconnected in a similar alternate manner proceeding from the outermost to the innermost sets of coils from each edge of the phase belt.

The unconnected lead of the coil side 1 of the set of coils at the first outermost edge of the left side of the phase belt shown at 21 forms the neutral terminal of one circuit of the illustrated phase winding in a star polyphase circuit, and the unconnected lead of the last coil side remaining at the middle of the phase belt, shown at 16 for the right-hand phase belt 22, forms the line terminal for the same circuit of the multiple coil phase winding.

A complete parallel circuit, formed by series connection of coil sides 1' through 16', is formed in a manner directly analogous to that described for the connection of coil sides 1 through 16. The unconnected lead of coil side 1' at the right outermost edge of phase belt 21 forms the neutral terminal and the unconnected lead of the last coil side 16' forms the line terminal, of this second circuit. The neutral terminals of the two circuits are joined together, to form the neutral terminal for connection of the complete phase winding in a star polyphase circuit, and the line terminals of the two parallel circuits are joined to form the line terminal for the complete multiple coil phase winding. With this connection the voltage differences between physically adjacent coils both within the phase and at the respective phase boundaries is minimized.

In FIGS. 2 and 4 each coil side shown has been numbered in a manner so that it approximately reflects the proportion or fraction of the total line voltage which appears at that particular coil side. In the simple lap winding pattern depicted in FIGS. 1 and 2, the voltage between any two adjacent coil sides is nearly proportional to the difference between their numbers, taken without regard for the presence or absence of a superscript. Thus, the voltage difference between the circumferentially adjacent coils within each phase belt in FIG. 2 is shown to be about 2/16th of the phase voltage. However, with respect to physically adjacent coil sides at the phase boundaries, essentially the full line voltage appears between the outermost coil sides in each phase belt giving rise to the need for substantial insulation at the phase boundaries. In contrast to the simple lap winding pattern of FIG. 2, in a winding serially interconnected in accordance with the instant invention as in FIGS. 3 and 4 by jumper leads, coils at the circumferential edges of each phase belt are at or close to neutral potential. Potential between coil sides increases relatively uniformly and nearly symmetrically from the respective outermost edges of each phase belt progressing along the periphery of the armature from either edge of the phase belt to its center. A polyphase armature made up of identical phase windings thus interconnected does not have an unduly large voltage between physically adjacent conductors at the phase boundaries. The resulting potential distribution can be inferred from FIG. 4 wherein it can be seen that the voltage between adjacent coils within a phase belt in this example is 4/16th of the total line voltage. The highest voltage at a phase break is only 4/16th of the total line voltage above neutral. Thus, the voltage across the phase break insulator normally employed at the phase boundary in the FIG. 4 circuit is the difference between 4 units from one phase and 3 units from another which comes to about 6/16th of the line voltage when phase relations are taken into account. While the voltage differences between coil sides quoted in this example do comprise substantial fractions of the total voltage, this fraction can be diminished if more coils are employed. If a larger number of coils were employed, the numerators of all the fractions discussed above would be unchanged but the denominators would become twice the number of coils in each circuit. This observation holds for the phase break voltage as well as for voltage within a phase belt.

It should be noted that the coils shown in FIGS. 1 through 4 may be taken to represent either single or multiturn coils as will be discussed more fully hereinafter with relation to the phase winding illustrated in FIGS. 5A, 5B, 5C and 5D. The system of jumper connections shown in FIG. 3 is believed to be more practical for high voltages than for lower voltages at any given power level because at the high voltage levels smaller size jumper lead connectors can be employed. The system of interconnection shown in FIGS. 3 and 4 is especially advantageous for use with multi-turn coils because of the reduced number of jumper connectors required.

For example, with a 1200 MVA generator of such a size that the generated voltage is 2 kilovolts (kv) per turn, the use of 12-turn coils and a circuit configuration according to FIGS. 3 and 4, reduces the current rating of the connectors to just over 1000 amperes, which can be carried by about 1 square centimeter of well-cooled copper. In this example, the line-to-line voltage rating of the phase windings is 333 kv, so that the system of jumper connectors would require careful attention to insulation design. The topology of the jumper interconnection is regular enough to permit insulation of the connections without great difficulty, especially in view of the fact that the connection can be made at the end of the windings where adequate space can be readily allotted for the jumper connections. In this example, the maximum voltage between adjacent coil sides in a phase belt is 48 kv, and the voltage between adjacent turns at the phase breaks is 81 kv, significantly less than the full line-neutral voltage.

It will be obvious that the coil sides depicted in FIG. 4 can alternatively be connected to form a single-circuit two-layer winding. A single-circuit connection which limits the voltage appearing across any phase boundary in each of the two layers would be as follows: 1-2-3-4-1'-2'-3'-4'-5-6-7-8-5'-6'-7'-8'-9-10-11-12-9'-10'-11-'-12'-13-14-15-16-13'-14'-15'-16'.

FIGS. 5A and 5B considered together illustrate one phase of a three-phase, four pole, single-circuit armature winding constructed in accordance with the invention. In FIGS. 5A and 5B, each hexagonal loop represents a multi-turn coil of the construction in FIG. 5C or of the construction in FIG. 5D.

The coil construction in FIG. 5C comprises a multi-turn coil in which the current path from a lead passes first through the end turn region of the coil. The current path comprises an integer number, n, (6 in the illustration) of complete traverses around the coil, and one additional traverse of the first (lead-end) end turn region, resulting in a coil having lead locations separated by the coil span. The coil construction in FIG. 5D comprises a multi-turn coil in which the current path from a lead passes first through the straight active portion of the coil. The current path comprises n traverses of each of the two straight active portions of the coil, resulting in a second coil construction having lead locations separated by the coil span, but with a winding sense opposite that of the first construction. For this discussion, coils of the type shown in FIG. 5C will be called Type 1; coils of the type shown in FIG. 5D will be called Type 2. The types of construction of coils shown in FIGS. 5C and 5D, respectively, are alternated around the periphery of the armature and are interconnected in series circuit relationship to form the single-circuit armature winding.

Figure 5D:
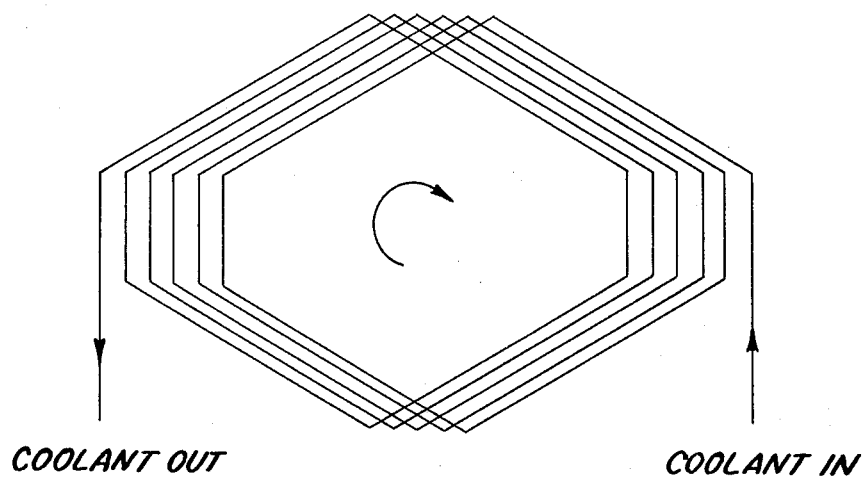
Figure 6B:
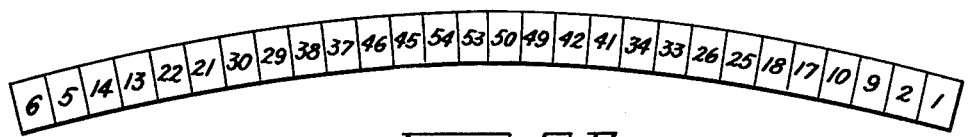
FIGS. 6A, 6B, 6C and 6D are cross-sectional views in the radial plane taken at lines 6A—6A, 6B—6B, 6C—6C and 6D—6D, respectively, through the armature winding shown in FIGS. 5A and 5B.
Figure 6A:
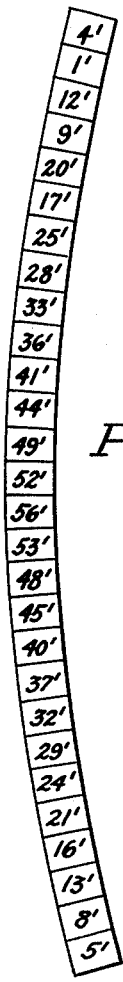
Figure 6C:
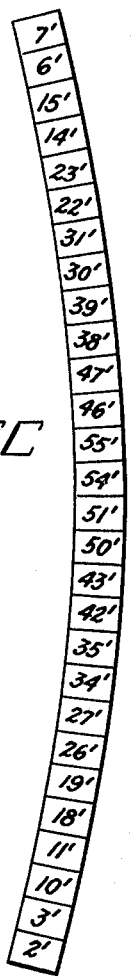
Figure 6D:
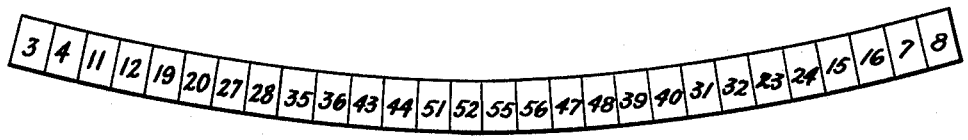

The coil leads for the serially-connected phase winding are clustered in four locations around the periphery of the armature, corresponding to the phase belt straight sections identified as first, second, third and fourth, in both FIGS. 5A and 5B. While the coils comprising the phase winding are all connected into a single series circuit, to help in understanding the interconnection of the coils it is useful to consider FIGS. 5A and 5B before the coils are joined together. Joints between coils are indicated by dots at the lower ends of the coil leads. The four locations in which the coil leads are clustered (corresponding to the phase belt straight coil side sections) are denoted, respectively, as the first, second, third and fourth groups of leads. Because the two types of coils are alternately interconnected in forming the single series circuit phase windings, connection of adjacent pairs of leads in the second group of leads shown in FIG. 5A results in joining coils which occupy the first and second phase belts with coils which occupy the second and third phase belts. When such a connection is made, it then is possible to enter one of the type 1 leads in the first group of leads opposite the first phase belt (for example, the lead labelled "Start of Phase A") and follow a series current path to the third phase belt. Connections of adjacent pairs of leads at the third and fourth groups of leads are identical to those described in the preceding sentence with relation to the second group of leads. As a result, series current paths beginning with the first group of leads can be followed to the fourth group of leads after the third group is connected. Connection of the fourth group of leads allows the serial current path to be traced from an input at the first group of leads completely around the perimeter of the armature and back to the first group. After connection of the adjacent pairs of leads within the fourth group, the coils comprising the phase winding have been formed into fourteen groups of four with each group of four coils being serially interconnected and comprised of two multi-turn coils as shown in FIG. 5C and two multi-turn coils as shown in FIG. 5D. Each group of four serially interconnected multi-turn coils then forms, in effect, a single complex coil traversing each of the four phase belts, with each multi-turn coil in the group occupying corresponding positions in their respective phase belts. As a result of this interconnection, the current path progresses from coil side to coil side around the periphery as in a wave winding.

The leads of these 14 groups of coils are all in the first group of leads. The identical groups of four serially-connected multi-turn coils impose near symmetry among the four phase belts and the order in which the fourteen groups of four serially connected multi-turn coils are subsequently connected in series, determines the distribution of voltage around the perimeter of the armature and the voltage difference across the phase boundaries of the respective phase windings of the armature in accordance with the principles of this invention.

The order in which the fourteen groups of four serially connected multi-turn coils, are in turn serially interconnected is selected such that both edges of all the phase belts are at nearly the same potential, thus permitting a wye connection (polygon connection) without any special provision for insulation at the phase boundaries (phase breaks). The beginning of the phase winding is selected to be a group of four serially connected multi-turn coils which is positioned at one outermost edge of each of the phase belts. The return lead from the first group of four serially-connected multi-turn coils is brought across the width of the phase belt and connected to the ingoing lead of the group of four serially-connected multi-turn coils located at the opposite edge of the respective phase belts. The return lead from this second group of coils then is brought back to the first-mentioned edge of the phase belt and connected to the group of four serially-connected multi-turn coils adjacent to the first-mentioned group. The fourth group of serially-connected multi-turn coils to be serially connected into the overall phase winding then is selected to be located at the next innermost position to the second group of coils on the respective phase belts, the fifth to the third, the sixth to the fourth, and so on until all of the coils in the winding have been interconnected into a single series circuit in the manner best seen in FIGS. 5A and 5B of the drawings.

In devising FIGS. 5A, 5B, and 6A–6D, the coils have been numbered in the order in which they occur in the complete phase circuit. The coil side through which the current path first passes is denoted by the coil number without superscript; The second coil side is denoted by the coil number with prime superscript. The current path is thus defined by the sequence $1\text{-}1^1\text{-}2\text{-}2^1\text{-}3\text{-}3^1 \ldots$.

By interconnecting all of the multi-turn coils into the fourteen groups of four coils, and then interconnecting the fourteen groups of coils in the pattern described above as best seen in FIG. 6, both edges of the phase belts are near neutral potential, if the first lead is at neutral. As a consequence, different phases can be placed next to one another with no extreme phase boundary (phase break) insulation requirements. Voltage across the winding increases regularly, progressing from either outermost edge of the respective phase belts to the center. The highest voltage appears at the center of the respective phase belts physically adjacent to coils which are close to it in potential and far removed from the neutral or low voltage potential of the other phase windings.

About the only complication resulting from this construction is the provision of a suitable means to insulate the pattern of interconnection of the jumper leads where a high voltage jumper lead for example may be required to cross over or under a low voltage or neutral potential jumper lead. As shown in FIG. 5A, the interconnection pattern of the jumper leads (shown dashed in FIG. 5A) appears fairly complicated, involving a substantial number of crossing jumper leads. The lead crossing problem can be readily overcome, however, since such crossover points can be designed to occur in areas remote from the active inner annulus region of the armature and where separation of the leads into different radial layers can be achieved along with the insertion of suitable insulation and mechanical support intermediate the different layers. Such insulating and mechanical supports can be premolded to accommodate the separate jumper leads and/or can be machined in a reasonably simple manner. If internal coolant for the armature coils is used, the coolant connections shown in FIGS. 5A, 5B, 5C and 5D may be employed.

From the foregoing description it will be appreciated that the invention provides a new and improved star connected, air gap, polyphase armature for alternating current electrical generators (or motors) and the method of making such armatures. The invention makes possible the construction of graded voltage armatures by the connection of adjacent winding turns of each phase in a series interconnection pattern such that potential increases nearly uniformly from coil to coil along the periphery of the active phase belt region of each phase winding of the polyphase armature. As a result the voltage in each phase winding increases from neutral or near neutral value at or near the extreme edges of each phase belt to near line voltage at the center of the phase belt with adjacent coil windings within the phase belts having low voltage differences, internally, between the coil windings, and no large voltage differences are produced between physically adjacent coils of different phase windings at the phase boundaries. The method and construction are particularly useful in the manufacture of polyphase armatures for high voltage, high current density superconducting generators and motors.

In addition to the above examples, the methods and patterns of interconnection described herein are applicable to any number of circuits, phases or poles employed in a machine for which the armature is being designed. Further, the principles herein disclosed can be applied as readily to helical wound armatures as to the involute-end windings herein illustrated and to short-pitch as well as full-pitch windings.

Having described several embodiments of a new and improved star-connected, air gap, polyphase armature having limited voltage gradients between the coil windings of the respective phase and at the phase boundaries, and the method of making the same, it is believed obvious that various changes, modifications, additions and alterations will occur to those skilled in the art in the light of the above teachings. Such changes, modifications, additions and alterations are believed to be encompassed by the present invention as defined by the appended claims.

We claim:

1. A star-connected air gap polyphase armature winding for a dynamoelectric machine comprising:
a plurality of wound coils electrically interconnected into a plurality of different phase groups to form polyphase windings of an armature;
each of said plurality of coils being wound with the windings at each circumferentially-outer edge of the respective phase belt being at a low electrical potential relative to the windings at the circumferential center of the same phase belt;
one lead from each circuit of each phase at one circumferentially-outer edge of a respective phase belt being connected in common to form a neutral terminal; and
one lead from each circuit of each phase at approximately the circumferential center of a respective phase belt being connected in common to form a line terminal for that phase.

2. A star-connected air gap polyphase armature winding for a dynamoelectric machine comprising:
a plurality of wound coils electrically interconnected into a plurality of different phase groups to form the polyphase windings of the armature, each coil in each phase group having a plurality of active regions in which an electromotive force is induced in the coil conductors; said active regions being connected into respective phase belt regions; the number of phase belt regions for each phase group being equal in number to the number of poles of the machine, the contiguous phase belt regions of all the phase groups forming the active annulus region of the armature with the space between respective phase belt regions comprising the phase boundaries;
each of said phase belts comprising a plurality of coils interconnected in a pattern such that a first coil side is adjacent one circumferentially-outer edge of one phase belt and is connected in series relationship to a second coil side disposed adjacent one circumferentially-outer edge of a second phase belt of the same phase; said second coil side is series connected to a third coil side disposed at the circumferentially-outer edge of said first phase belt opposite said first coil side; said third coil side is series connected to a fourth coil side disposed at the circumferential edge of said second phase belt opposite said second coil side; whereby a coil or coils at or near one edge of a phase belt is connected in series electrical circuit relationship with a coil or coils at or near the opposite edge of the same phase belt physically displaced circumferentially-inwardly from the first and second outermost coils; said coil or coils being serially interconnected with each other and with the first-mentioned set of outermost coil or coils proceeding in the same alternate manner commencing from the outermost to the innermost coils of each phase belt, the interconnected lead of the coil or coils at the first edge of the phase belt forming the neutral terminal for connection of the phase winding in a star circuit and the unconnected lead of the last coil or coils remaining at the middle of the phase belt forming the line terminal for the multiple coil phase winding to thereby minimize the voltage differences between physically-adjacent coils of the different phase windings at the respective phase boundaries.

3. A star-connected air gap polyphase armature according to claim 1 wherein the coils in the respective phase windings are wound in a single layer.

4. A star-connected air gap polyphase armature according to claim 1 wherein the coils in the respective phase windings are wound in double layers which overlie in the phase belt region to form upper and lower layers of coils.

5. A star-connected air gap polyphase armature according to claim 2 wherein the coils in the respective phase windings are wound in a single layer.

6. A star-connected air gap polyphase armature according to claim 2 wherein the coils in the respective phase windings are wound in double layers which overlie in the phase belt region to form upper and lower layers of coils.

7. A star-connected air gap polyphase armature according to claim 1, 2, 3, 4, 5 or 6 wherein each coil in the respective phase windings is a single turn coil comprised of a single insulated conductor forming a single winding turn.

8. A star-connected air gap polyphase armature according to claim 1, 2, 3, 4, 5 or 6 wherein each coil in the respective phase windings is a multiple turn coil comprised of a single insulated conductor formed into a multiplicity of winding turns.

9. A star-connected air gap polyphase armature according to claim 1, 2, 3, 4, 5 or 6 wherein each coil in the respective phase windings is comprised of a multiplicity of paralleled insulated strands formed into a single conductor having a common terminal at the respective ends thereof, and formed into a single winding turn.

10. A star-connected air gap polyphase armature according to claim 1, 2, 3, 4, 5 or 6 wherein each coil in the respective phase winding is comprised of conductors having a multiplicity of paralleled insulated strands formed into a single conductor having a common terminal at either end, said conductors being formed into a multiplicity of winding turns.

11. An armature according to claim 1, 2, 3, 4, 5 or 6 in which each coil in the respective phase windings comprises a single turn coil comprised of two coil halves, each comprised of a single insulated conductor, and joined together at the end away from the jumper end to form a single turn coil.

12. An armature according to claim 1, 2, 3, 4, 5 or 6 in which each coil in the respective phase windings comprises a multiple turn coil comprised of two coil halves, each comprised of multiple insulated conductors, said conductors being connected in series relationship at the respective ends of the coil halves to form a multiple turn coil.

13. An armature according to claim 1, 2, 3, 4, 5 or 6 in which each coil in the respective phase windings comprises a single turn coil comprised of two coil halves, each half comprised of a multiplicity of paralleled, insulated strands, the halves joined together at the end away from the jumper end to form a single winding turn, with the paralleled, insulated strands having a common terminal at the respective ends thereof.

14. An armature according to claim 1, 2, 3, 4, 5 or 6 in which each coil in the respective phase windings comprises a multiple turn coil comprised of two coil halves, each comprised of multiple insulated conductors, each conductor containing a multiplicity of paralleled, insulated strands, said conductors being connected in series relationship at either end of the coil halves to form a multiple turn coil, with the paralleled, insulated strands having a common terminal at the respective ends thereof.

15. An armature according to claim 8, in which each multiple turn coil is provided with a common covering layer of insulating material.

16. An armature according to claim 9, in which the multiplicity of paralleled strands is provided with a common covering layer of insulating material.

17. An armature according to claim 10, in which each multiple turn coil is provided with a common covering layer of insulating material.

18. An armature according to claim 12, in which each coil half is provided with a common covering layer of insulating material.

19. An armature according to claim 13, in which each coil half is provided with a common covering layer of insulating material.

20. An armature according to claim 14, in which each coil half is provided with a common covering layer of insulating material.

* * * * *